(12) United States Patent
Zheng et al.

(10) Patent No.: US 9,980,197 B2
(45) Date of Patent: May 22, 2018

(54) BASEBAND PROCESSING CIRCUITRY FOR WAKE-UP RECEIVER

(71) Applicant: The Regents of the University of Michigan, Ann Arbor, MI (US)

(72) Inventors: Nan Zheng, Ann Arbor, MI (US); Pinaki Mazumder, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 0 days. days.

(21) Appl. No.: 15/428,992

(22) Filed: Feb. 9, 2017

(65) Prior Publication Data

US 2017/0230889 A1    Aug. 10, 2017

Related U.S. Application Data

(60) Provisional application No. 62/292,931, filed on Feb. 9, 2016.

(51) Int. Cl.
*H04B 7/00*     (2006.01)
*H04W 40/00*    (2009.01)
*H04B 17/373*   (2015.01)
*H04W 52/02*    (2009.01)

(52) U.S. Cl.
CPC ........ *H04W 40/005* (2013.01); *H04B 17/373* (2015.01); *H04W 52/0229* (2013.01)

(58) Field of Classification Search
CPC ..... H04W 40/005; H04B 17/373; H04L 43/16
USPC ........................................................ 455/231
See application file for complete search history.

(56) References Cited

U.S. PATENT DOCUMENTS 4,884,284 A * 11/1989 Nakayama ............. H04B 1/709
                                                        375/149

* cited by examiner

*Primary Examiner* — Sanh Phu
(74) *Attorney, Agent, or Firm* — Reising Ethington P.C.

(57) ABSTRACT

A method of operating a baseband processing unit for a wake-up receiver. The method includes receiving a signal from a transmitting device that contains a pseudo-random code. The method further includes adding a local pseudo-random code associated with a first correlator of the processing unit with a local pseudo-random code associated with a second correlator of the processing unit to generate a summed local pseudo-random code, and correlating by the first correlator the received pseudo-random code with the summed local pseudo-random code. The method still further includes comparing an output of the first correlator with a predetermined threshold, and determining whether or not to generate a wake-up signal based on the comparison. A baseband processing unit for performing this methodology is also provided.

18 Claims, 7 Drawing Sheets

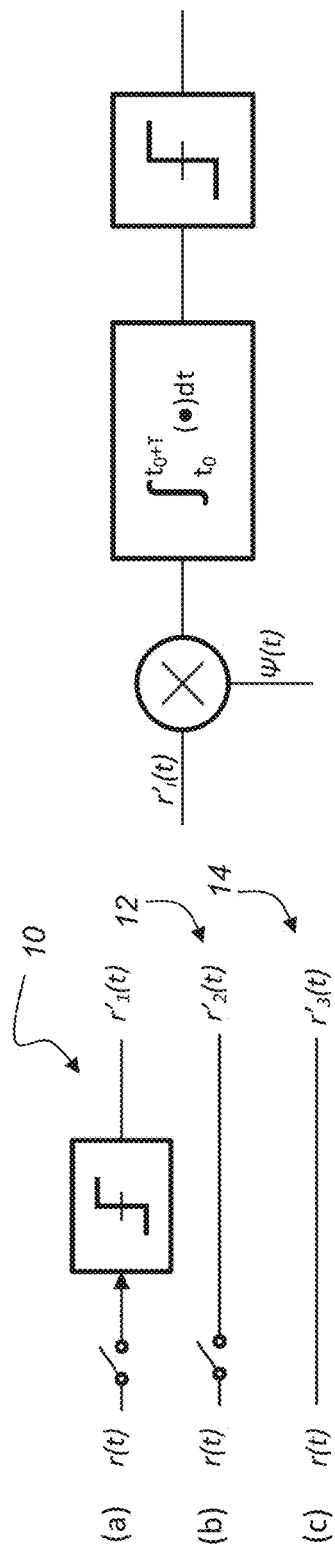
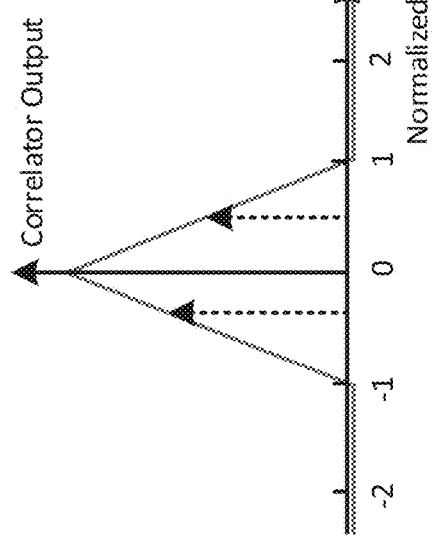
FIG. 1
FIG. 3

BASEBAND PROCESSING CIRCUITRY FOR WAKE-UP RECEIVER

CROSS-REFERENCE TO RELATED APPLICATION

This application claims the benefit of U.S. Provisional Application No. 62/292,931 filed Feb. 9, 2016, the entire contents of which are hereby incorporated by reference.

TECHNICAL FIELD

The present disclosure relates generally to wake-up receivers, and more particularly, to baseband processing circuitry for wake-up receivers.

BACKGROUND

Low-power CMOS systems with wireless capability may be utilized in a vast number of applications, such as, for example and without limitation, wireless sensor networks, implantable devices and the future "internet of things" (IoT), to cite a few examples. Though these low-power systems may be designed for various or different applications, they generally share certain similarities, namely, small form factor, low power consumption and large idle time.

Integrating multiple circuit blocks of such systems in a single CMOS chip helps reduce the size of the system. Various circuit techniques, such as, for example, subthreshold operation for digital circuits and current reuse for analog circuits have been proposed to reduce power consumption. To further reduce power consumption, the system may be put into a reduced power consuming mode (i.e., a "sleep" mode) when no task is assigned. More specifically, most power consuming blocks or components of the system, RF transceiver or receiver, are turned "off" during the sleep mode to reduce the amount of power consumed and thus, extend the life of the battery of the system. This, however, poses obstacles on other components of the system that want to communicate with the "sleeping" component (e.g., transceiver or receiver).

One way for overcoming this obstacle is to periodically "wake up" the sleeping device to listen to a communication channel. However, this not only requires an accurate timer to achieve synchronization among components in the system, but also increases latency. Another solution is to use a wake-up receiver (WuRX) that consumes extremely low power to continuously monitor the communication channel and also achieves synchronization between devices. Upon the detection of a "wake-up" signal by the WuRX, the WuRX acts to wake the sleeping component such that it may receive data being communicated to it (i.e., the WuRX may send a one-bit signal to the receiver). This may be accomplished by generating, for example, a single wake-up bit (i.e., a logic "1" or "0", depending on the particular implementation) that causes the sleeping component to turn "on" or to trigger some other predetermined event(s).

There are many WuRX are known in the art. Some of these focus on the RF front-end design. Indeed, when the power budget for the WuRX is not tight, the RF front-end normally consumes most of the power and determines the performance. However, when the power budget for the WuRX is near or below the microwatt range, the RF front-end is most likely to be implemented as a simple envelope detector followed by a baseband amplifier for down-mixing. In this circumstance, power consumption of the baseband processing circuitry of the WuRX begins to play an important role. Recently, interest has been shown in nanowatt wake-up receivers. For such low-power consumption, the amount of power burned by the baseband processing circuitry of the WuRX is significant, if not dominant.

Accordingly, there is a need for baseband processing circuitry for a WuRX that minimizes and/or eliminates one or more of the above-identified deficiencies.

SUMMARY

According to one embodiment, there is provided a method of operating a baseband processing unit of a wake-up receiver. The method comprises receiving a signal from a transmitting device that contains a pseudo-random code. The method further comprises adding a local pseudo-random code associated with a first correlator of the processing unit with a local pseudo-random code associated with a second correlator of the processing unit to generate a summed local pseudo-random code, and correlating by the first correlator the received pseudo-random code with the summed local pseudo-random code. The method still further comprises comparing an output of the first correlator with a predetermined threshold, and determining whether or not to generate a wake-up signal based on the comparison.

According to another embodiment, there is provided a method of operating a baseband processing unit of a wake-up receiver. The method comprises receiving a signal from a transmitting device that contains a pseudo-random code. The method further comprises correlating by a first correlator of the processing unit the received pseudo-random code with a first local pseudo-random code associated with the first correlator, and correlating by a second correlator of the processing unit the received pseudo-random code with a second local pseudo-random code associated with the second correlator. The method still further comprises adding an output of the first correlator with an output of the second correlator to determine a combined output of the first and second correlators, comparing the combined output of the first and second correlators with a predetermined threshold, and determining whether or not to generate a wake-up signal based on that comparison.

According to yet another embodiment, there is provided a method of operating a baseband processing unit of a wake-up receiver. The method comprises receiving by a noise estimation unit of the processing unit outputs of one or more correlators of the processing unit. The method further comprises estimating a noise level of the output of the one or more correlators based on the received correlator outputs, and adjusting one or more operating parameters of the processing unit based on the estimated noise level.

BRIEF DESCRIPTION OF DRAWINGS

Preferred exemplary embodiments will hereinafter be described in conjunction with the appended drawings, wherein like designations denote like elements, and wherein:

FIG. 1 is a schematic and diagrammatic illustration of common architectures for a baseband processing circuit or unit;

FIG. 3 is a graph illustrating how the uncertainty in the time at which integration starts ($t_0$) affects correlation results of the baseband processing circuit illustrated in FIG. 2;

DETAILED DESCRIPTION OF ILLUSTRATED EMBODIMENTS

Figure 2:
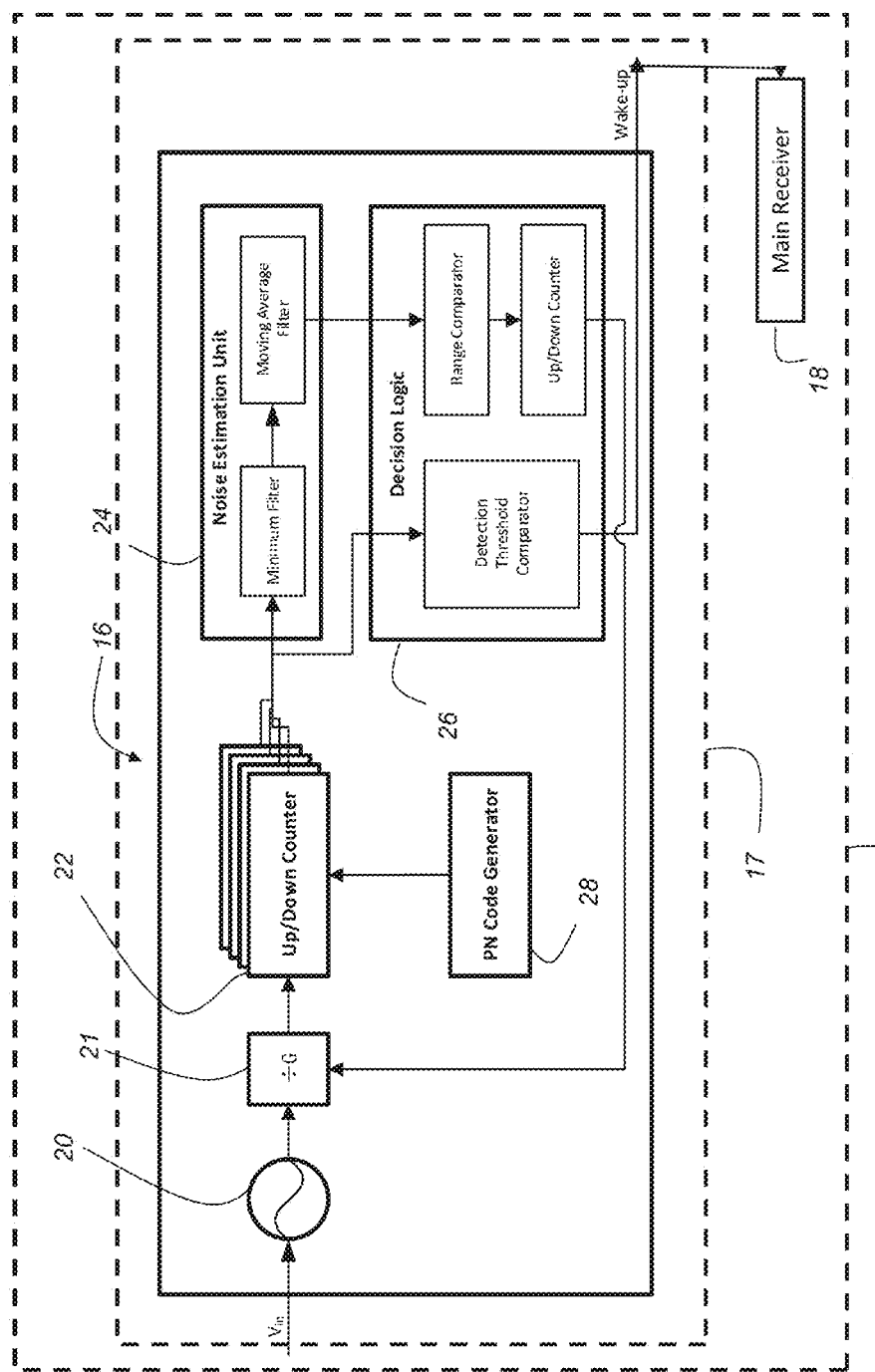
FIG. 2 is a schematic and diagrammatic illustration of a system comprising, in part, a wake-up receiver, and illustrating an embodiment of baseband processing circuit or unit of the wake-up receiver.

Before various aspects of the present disclosure are described in detail, an overview of baseband processing for a wake-up receiver (WuRX) configured for use in conjunction with a main receiver will be provided for the purpose of providing context.

FIG. 1 illustrates three (3) generic architectures for baseband processing circuitry. The structure designated by reference numeral 10 provides good isolation between the receiver front end and the receiver baseband such that these two parts can be designed separately. This particular architecture, however, suffers from performance degradation because of the hard-decision decoding it employs. The structures designated by reference numerals 12 and 14, respectively, are both based on soft-decision decoding, with structure 12 comprising discrete-time, soft-decision decoding; and structure 14 comprising continuous-time, soft-decision decoding. A principal difference between structure 12 and structure 14 is that structure 14 provides additional filtering through a chip-level matched filter. Such a filter having a frequency response determined by the clock can help reduce noise. In an embodiment, the baseband processing circuitry or unit (as it will be referred to herein) described below employs continuous-time, soft-decision decoding.

As is known in the art, the functionality of a baseband processing unit or circuit for a WuRX is represented by equation (1):

$$\int_{t_0}^{t_0+T} [\hat{s}(t)+\hat{n}(t)]\psi(t)+n_{added} \; th \quad (1)$$

where: $\hat{s}(t)$ and $\hat{n}(t)$ are the input signal and noise to the baseband processing unit, respectively; $\psi(t)$ is the wake-up symbol or signature known by both the transmitter and the receiver; $n_{added}$ is the noise added by the baseband circuit; and th is the threshold used by the baseband processing circuit to determine whether the appropriate "wake-up" signal is present in a received signal, and thus, to "wake-up" the main receiver (i.e., if the threshold is exceeded, then the WuRX acts to wake the receiver; and if the threshold is not exceeded, the WuRX does not wake the main receiver).

The choice of $\psi(t)$ that is used has little to no direct impact on the signal-to-noise ratio (SNR) in an interference-free scenario considering noise is uncorrelated to any deterministic function. An instance where $\psi(t)$ is chosen to be a constant corresponds to receivers that directly integrate the received energy to see if it exceeds a predetermined threshold. However, such a configuration performs less desirably when interference is present. On the other hand, pseudo-random codes or sequences are good candidates for $\psi(t)$ because they are much more robust against interference and also because addressing can be supported by employing several lightly cross-correlated sequences in a network. The number of bits N of the pseudo-random code(s) or sequence(s) can be chosen based on the size of the network (i.e., the number of devices in the network) and the level of anti-interference capability that is needed.

Turning back to equation (1), $t_0$ is the time instant at which integration begins. Ideally, the WuRX is synchronized with the transmitting device in order to maximize the SNR. It may be tricky, however, to select the correct $t_0$ since the WuRX has no knowledge of it before detecting the wake-up signal. The challenge with synchronization also exists in traditional direct-sequence spread spectrum (DSSS) systems. In such systems, three (3) known searching methods are commonly used: sequential searching; parallel searching; and hybrid searching.

In sequential searching, only one correlator is used to process the received data. More specifically, the correlator correlates the received data (i.e., a pseudo-random code contained in the received data) with a locally generated or stored pseudo-random code. If synchronization is not reached based on that initial correlation, the local code is shifted by one bit in the next clock cycle, and the correlation function is repeated. If synchronization is still not reached, the local code is again shifted by one bit each subsequent clock cycle until synchronization is reached. The technique consumes little power yet yields a mean synchronization time of N/2, where N is the number of bits in the pseudo-random code.

The parallel search technique uses N parallel correlators (i.e., the number of correlators is equal to the number of bits in the pseudo-random code) to correlate the received data with all possible shifts of a local pseudo-random code. This technique ensures a synchronization time of one (1), yet consumes a relatively large amount of power.

The hybrid search technique is compromise between the sequential and parallel searching techniques, providing an additional degree of freedom for the system design.

In addition to the three (3) searching techniques described above, several more advanced techniques exist such as binary searching based on auxiliary sequences, and iterative message passing techniques. However, these advanced techniques are generally too complex to be implemented in systems with low power consumption requirements.

In a WuRX, it is often preferable to use the parallel searching technique. To illustrate the reasons why, suppose the maximum signal duration is $T_{max}$. For a system employing the parallel searching technique, N correlators are used and the integration time is $T_{max}$. For a system employing the hybrid technique, N/2 correlators are used, however, the integration time is reduced to $T=T_{max}/2$. Therefore, the SNR is halved and the power consumption remains roughly the same since the number of correlators is halved, yet the frequency is doubled.

Another important quantity in equation (1) is that of the threshold term th. Under the assumption of white noise, the false alarm rate (i.e., the rate at which the presence of a wake-up signal is mistakenly detected) and miss rate (i.e., the rate at which the presence of a wake-up signal is missed) of a WuRX are $Q\left(\dfrac{th}{\sigma_n}\right)$ and $1 - Q\left(\dfrac{th-s}{\sigma_n}\right)$, respectively, where s and n are the signal and noise components, respectively, at the output of the correlators of the processing unit, and $\sigma_n$ represents the standard deviation of a random variable n. Because the threshold value th has a direct impact on the performance of the WuRX, the value must be carefully chosen. If the value is too low, then the false alarm rate of the WuRX may be undesirably high; and if it is too high, then the miss rate may be undesirably high. Additionally, the optimum value for the threshold is at least partially dependent upon the noise level. Thus, as will be described in greater detail below, one aspect of the present disclosure relates to an algorithm that can adaptively select or choose the optimum threshold value in order to maintain good system performance under various conditions (e.g., noise levels).

In addition to the above, another important aspect of a WuRX baseband processing unit relates to the maintenance of a certain dynamic range. For an analog baseband circuit, the lower limit for the input power is set mainly by the mismatch between various circuit components, such as, for example, MOSFETs, capacitors and/or resistors, and the noise in the analog circuit, whereas the upper limit is set by the non-linearity of certain circuit components or blocks, for example, amplifiers and/or mixers. For a digital baseband circuit, the lower limit is typically set by quantization noise, whereas the upper limit is determined by the number of bits of the digital system. Low-power designs, whether analog or digital, are often less robust to process, voltage, and temperature (PVT) variations compared to high-power designs. Besides, input power to the WuRX (including both the signal and noise) fluctuates spatially and temporally as interferences manifest themselves as noise. Accordingly, baseband circuits need to maintain good dynamic range such that SNR can be maximized as the noise level fluctuates.

It is against the foregoing backdrop that various aspects of the present disclosure will now be described.

With reference to FIG. 2, the present disclosure relates generally to a mixed-signal, digital-intensive architecture for a baseband processing circuit or unit 16 of a WuRX 17 that is designed and configured to address (e.g., eliminate or at least mitigate), for example, uncertainty in sampling time, poor false alarm rates and/or poor dynamic range maintenance prevalent in conventional baseband processing units. As is known in the art and shown in FIG. 2, the baseband processing unit 16 is configured to be electrically connected to (either directly or indirectly through one or more other components of the WuRX 17), and used in conjunction with, a main receiver 18 of a larger system 19 of which the receiver 18 and the WuRX 17 may both be a part, such as, for example and without limitation, a wireless sensor network. In the embodiment illustrated in FIG. 2, the unit 16 comprises a voltage-controlled oscillator (VCO) 20, a divider 21, one or more correlators (e.g., up/down counters) 22, a noise estimation unit 24, and decision logic 26. The unit 16 may also include a pseudo-random code or sequence generator 28.

Each of the aforementioned components is well-known in the art, and therefore, a detailed description of these components will not be provided. To summarize, however, an input signal from a transmitting device ($v_{in}$ in FIG. 2) is received at the VCO 20. The VCO 20 acts as both a quantizer and integrator. Quantization is to provide an interface between an analog input and the downstream digital circuitry; as such the VCO 20 may comprise an analog to digital converter (ADC). Integration is essentially a matched filter at the chip level. The divider 21 behaves as a programmable gain amplifier in the phase domain. As will be described below, the divider 21 is part of a dynamic range widening feedback loop.

The correlator(s) 22, which may comprise one or more up/down counters (e.g., one up/down counter for each correlator), correlate the signal received by the WuRX 17 (i.e., $v_{in}$) with one or more pseudo-random codes that is/are stored (i.e., in a suitable memory device) or generated (i.e., by pseudo-random code generator 28) locally in the unit 16. In an embodiment, the unit 16 includes a single correlator 22; in other embodiments, however, the unit 16 may comprise a plurality of correlators 22 (e.g., FIG. 2 depicts an illustrative embodiment wherein the unit 16 includes four (4) correlators). More specifically, in an embodiment, the number of correlators 22 corresponds to number of devices in the system or network of which the WuRX 17 is a part. For purposes of illustration only, the description below will be with respect to an embodiment wherein the unit 16 includes a plurality of correlators 22; though the present disclosure is certainly not limited to the use of any particular number of correlators.

As will be described in greater detail below, the noise estimation unit 24 receives the output(s) from the correlator(s) 22 and employs an algorithm to estimate the noise level of the output of the correlators 22.

Among other things, the decision loic 26 compares an output from each correlator 22 with a threshold that is, in an embodiment and as will be described below, dependent upon the noise level of the output of the correlators estimated by the noise estimation unit 24, and is used to determine if a wake-up signal should be generated to wake-up the main receiver 18 to which the WuRX 17 is electrically connected. In addition, the decision logic 26 may also evaluate if the estimated noise level falls into a predetermined range. If, in an embodiment, it is determined that the estimated noise level does not fall with the range, then a feedback signal may be generated to control the gain of the divider 21.

In an embodiment, the processing unit 16 may be implemented or embodied on a single chip either alone or with other components of the WuRX 17 so as to form a "system-on-a-chip." In other embodiments, however, multiple chips may be utilized (e.g., one or more of the components of the unit 16 may be disposed on a different chip than one or more of the other components). Accordingly, it will be appreciated that the present disclosure is not limited to any particular arrangement or configuration of the components of the processing unit 16.

One drawback of conventional WuRX baseband processing units that the processing unit 16 overcomes or at least addresses is that related to SNR degradation caused by sampling time offset as a result of the clocks of the transmitting device and the WuRX not being synchronized, and thus, uncertainty in the term $t_0$ in equation (1) above. Traditionally over-sampling is employed to counteract the sampling time offset and randomness in sampling time. This, however, is done at the expense of higher power consumption as every doubling of the over-sampling rate (OSR) roughly results in the doubling of the power consumption. Flow the uncertainty in $t_0$ affects the correlation results is shown in FIG. 3, wherein an OSR of one (1) is used. For a pseudo-random code (e.g., an M-sequence code) of length N bits, the output of a correlator 22 is $s+n_o+n$, where: s is the desired signal part of the input signal and may be determined using equation (2) below; n is the noise component after the correlation function and may be determined using equation (3) below; and $n_o$ is a model of the noise introduced by the uncertainty in $t_0$ and may be determined using equation (4) below.

$$s = \frac{(2^{OSR+1} - 1)N - 1}{2^{OSR+1}} \quad (2)$$

$$n \sim N\left(0, \sqrt{N}\, \sigma_{BB}\right) \quad (3)$$

$$n_o \sim U\left(-\frac{N+1}{2^{OSR+1}}, \frac{N+1}{2^{OSR+1}}\right) \quad (4)$$

In equations (2)-(4), OSR is the oversampling rate that is used, N is the number of bits in the pseudo-random code being utilized, and $\sigma_{BB}$ is a standard deviation representing a measure of how strong the noise is at the input of the correlators. If it can be assumed that the start time of integration, $t_0$, is a uniformly distributed random variable, then $n_o$ is also a uniformly distributed variable, as shown in equation (4).

Ideally, the value of s is equal to the value of N. Accordingly, if the pseudo-random code used in the correlation function is seven (7) bits in length (i.e., N=7), ideally s=7. Practically, however, the uncertainty of the sampling time results in a value of s that is less than N. For example, in the case of N=7, if the pseudo-random code in the received signal is −1−1111−11 (note, −1 is used instead of logic 0 for purposes of the mathematical correlation but is nonetheless a binary representation) and the local pseudo-random code used by the correlator is −1−1111−11, then the output of the correlator would be s=7 because each bit in the received code matches the corresponding bit in the local pseudo-random code with which it was correlated (i.e., (−1−1111−11) corr (−1−1111−11)=[(−1)*(−1)]+[(−1)*(−1)]+[(1)*(1)]+[(1)*(1)]+[(1)*(1)]+[(−1)*(−1)]+[(1)*(1)]=7). However, if, due to the uncertainty in the sampling time, the received code is 1−1−1111−1, and the local code is −1−1111−11, then the output of the correlator would be s=−1 (i.e., (1−1−1111−1) corr (−1−1111−11)=[(1)*(−1)]+[(−1)*(−1)]+[−(1)*(1)]+[(1)*(1)]+[(1)*(1)]+[(1)*(−1)]+[(−1)*(1)]=−1). Accordingly, the output of a correlator is a random variable.

In an instance wherein a local pseudo-random code is directly correlated with the received data, the miss rate $P_{miss}$ of the baseband processing unit, which, again, is the rate at which a wake-up signal present in the received data is missed or not detected, can be estimated using equation (5):

$$P_{miss} = \quad (5)$$
$$\frac{1}{2} + \frac{2^{OSR-1}\sqrt{2N}\,\sigma_{BB}}{N+1}\left[P\left(\frac{th - s + \frac{N+1}{2^{OSR+1}}}{\sqrt{2N}\,\sigma_{BB}}\right) - P\left(\frac{th - s - \frac{N+1}{2^{OSR+1}}}{\sqrt{2N}\,\sigma_{BB}}\right)\right]$$

where, as with equation (3) above, $\sigma_{BB}$ is a standard deviation representing a measure of how strong the noise is at the input of the correlators, and P(x) is determined using equation (6):

$$P(x) = x \cdot erf(x) + \frac{\exp(-x^2)}{\sqrt{\pi}} \quad (6)$$

where x is the variable of the P(x) functions in equation (5), and erf(x) is the error function or Gauss error function of the variable x. Because of the noise $n_o$ resulting from the randomness of the sampling time (i.e., the uncertainty of $t_0$), the miss rate is deteriorated. As was briefly described above, one way to counteract this is to oversample the received signal; however, this is done at the expense of increased power consumption.

Another way, however, is that the outputs of two or more correlators (e.g., two or more adjacent correlators) may be added or summed together, and the result compared with the threshold th to determine whether or not to generate a wake-up signal. For example, if there are two (2) correlators in the processing unit each having a local pseudo-random code associated therewith, the input signal may be correlated with each of the pseudo-random codes associated with the two correlators, and then the outputs of the first and second correlators may be added together and the sum or combined output may be compared with the threshold th.

Similarly, in an instance where there are three (3) correlators in the processing unit each having a local pseudo-random code associated therewith, the input signal may be correlated with each of the pseudo-random codes associated with the three correlators. Then, the outputs of the first and second correlators may be added together and the sum or combined output may be compared with the threshold th, and the outputs of the second and third correlators may be added together and the sum or combined output may be compared with the threshold th. In an embodiment, the outputs of the first and third correlators may also be added together and the sum or combined output may be compared with the threshold th.

In an example wherein there are four (4) correlators in the processing unit each having a local pseudo-random code associated therewith, the input signal may be correlated with each of the pseudo-random codes associated with the four correlators. Then, the outputs of the first and second correlators may be added together and the sum or combined output may be compared with the threshold th, the outputs of the second and third correlators may be added together and the sum or combined output may be compared with the threshold th, the outputs of the third and fourth correlators may be added together and the sum or combined output may be compared with the threshold th, and finally the outputs of the fourth and first correlators may be added together and the sum or combined output may be compared with the threshold th.

Accordingly, it will be appreciated in view of the foregoing that any number of correlators and associated or corresponding local pseudo-random codes may be used. It should also be appreciated that in at least some embodiments wherein the baseband processing unit includes more than two correlators, the outputs of any two or more correlators may be combined and used as described above.

In any event, in the embodiment described above, one or more summed or combined output(s) of two or more correlators is/are compared with the threshold th to determine whether to generate a wake-up signal. In one embodiment, a determination is made to generate a wake-up signal if the summed or combined outputs of two or more correlators exceeds (or, in an embodiment, meets or exceeds) the threshold. In an embodiment wherein multiple summed outputs are compared to the threshold th, if any one of the summed outputs exceeds (or, in an embodiment, meets or exceeds) the threshold, a determination is made to generate a wake-up signal.

Yet another way is that two or more local pseudo-random codes (e.g., two pseudo-random codes corresponding to adjacent correlators) may be added or summed together to create a new summed pseudo-random code that may then be used in a correlation instead of one of the original codes. For example, if there are two (2) correlators in the processing unit, and thus, two local pseudo-random codes, the local pseudo-random codes corresponding to the first and second correlators may be summed and the resulting summed local pseudo-random code may be used by the first correlator to correlate the received signal.

If there are three (3) correlators in the processing unit, and thus, three local pseudo-random codes, the local pseudo-random codes corresponding to the first and second correlators may be summed and the resulting summed local pseudo-random code may be used by the first correlator to correlate the received signal. Similarly, the pseudo-random codes corresponding to the second and third correlators may be summed and the resulting summed local pseudo-random code may be used by the second correlator to correlate the received signal. And finally, the local pseudo-random codes corresponding to the third and first correlators may be summed and the resulting summed local pseudo-random code may be used by the third correlator to correlate the received signal. Alternatively, the pseudo-random codes corresponding to the first, second, and third correlators may all be summed together and the resulting summed local pseudo-random code may be used by the first, second, or third correlator to correlate the received signal.

In yet another example, if there are four (4) correlators in the processing unit, and thus, four local pseudo-random codes, the local pseudo-random codes corresponding to the first and second correlators may be summed and the resulting summed local pseudo-random code may be used by the first correlator to correlate the received signal. Similarly, the local pseudo-random codes corresponding to the second and third correlators may be summed and the resulting summed local pseudo-random code may be used by the second correlator to correlate the received signal. In the same way, the local pseudo-random codes corresponding to the third and fourth correlators may be summed and the resulting summed local pseudo-random code may be used by the third correlator to correlate the received signal. And finally, the local pseudo-random codes corresponding to the fourth and first correlators may be summed and the resulting summed local pseudo-random code may be used by the fourth correlator to correlate the received signal.

By way of illustration, assume that pseudo-random codes being used are 7-bit codes, and that a first local pseudo-random code is −1−1111−11 and a second local code is −1111−11−1. Adding or summing these two codes together results in a "new" code of −2022000, and when the common factor of two (is taken out, the resulting code to be used is −1011000. While in the description above two, adjacent codes are summed or added together, it will be appreciated that in other embodiments, more than two codes may be added; and as such, the present disclosure is not intended to be limited to the adding or summing of any particular number of codes.

Accordingly, it will be appreciated in view of the foregoing that any number of correlators and associated or corresponding local pseudo-random codes may be used. It should also be appreciated that in at least some embodiments wherein the baseband processing unit includes more than two correlators, the local pseudo-random codes of any two or more correlators may be combined or added together to generate one or more summed local pseudo-random codes that may be used as described above.

In any event, in the embodiment described above, the output(s) of the correlator(s) is/are compared with the threshold th to determine whether to generate a wake-up signal. In one embodiment, a determination is made to generate a wake-up signal if the output of the correlator exceeds (or, in an embodiment, meets or exceeds) the threshold. In instance wherein more than one correlator output is compared to the threshold th, if any one of the outputs exceeds (or, in an embodiment, meets or exceeds) the threshold, a determination is made to generate a wake-up signal.

Using the method described above, the output of a correlator is now s+n, where s and n may be determined using equations (7) and (8), respectively:

$$s = \frac{(2^{OSR} - 1)N - 1}{2^{OSR}} \quad (7)$$

$$n \sim N\left(0, \sqrt{OSR \times N - \frac{N+1}{2}} \times \frac{\sigma_{BB}}{\sqrt{OSR}}\right) \quad (8)$$

Figure 4:
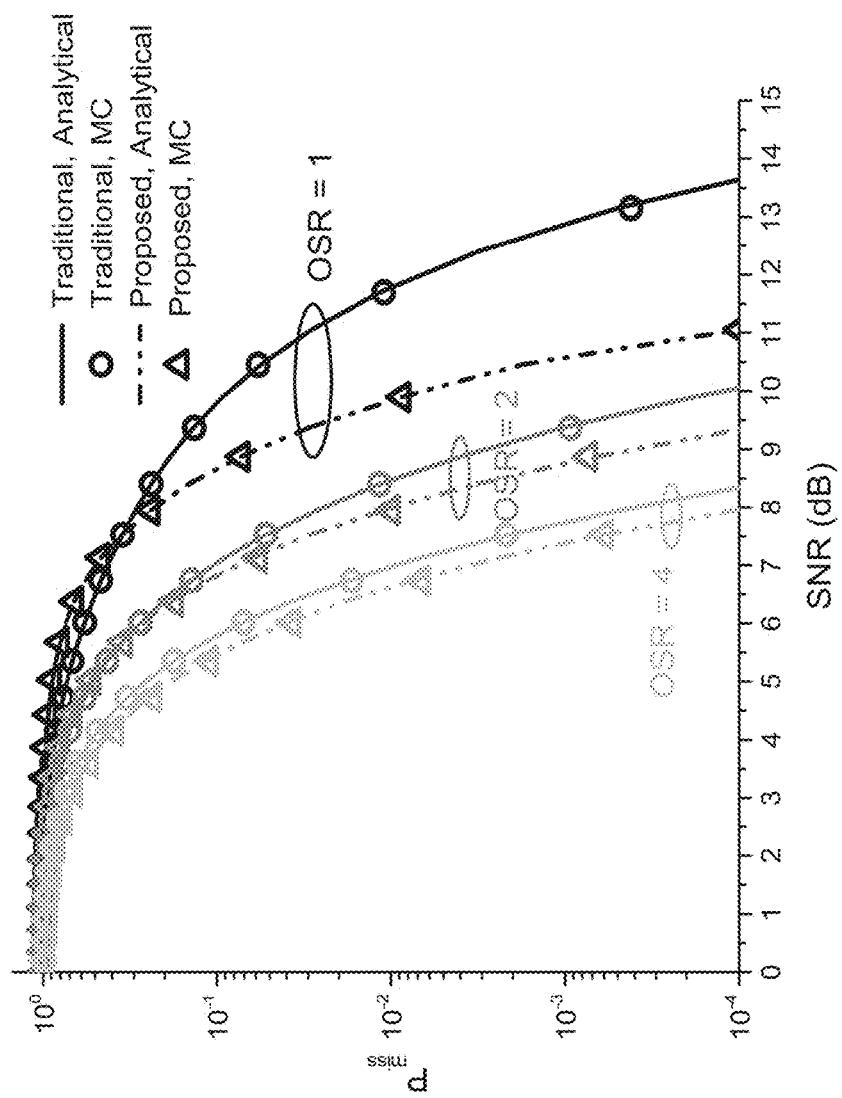
FIG. 4 is a graph illustrating a comparison of miss rates between conventional techniques and the correlation techniques/methodologies of the present disclosure.

The aforedescribed technique results in no increase in power consumption and the sensitivity of the correlations performed are improved. Additionally, the miss rate is improved. More particularly, the miss rate for the above-described method can be estimated using equation (9):

$$P_{miss} = \Phi\left(\frac{th - s}{\sqrt{OSR \times N - \frac{N+1}{2}} \times \frac{\sigma_{BB}}{\sqrt{OSR}}}\right) \quad (9)$$

where $\Phi$ is the cumulative distribution function (CDF) of a normal distribution and is known. The miss rates obtained from a conventional technique and that described above are compared in FIG. 4 for different OSR values. As can be seen, the method described above outperforms the conventional method for the different OSR vales. As the OSR decreases, the improvement becomes more and more remarkable. This is because the effect of $n_o$ becomes more significant as the OSR value decreases. For the case of OSR=1, the method described above achieves a 2 dB improvement in SNR at a bit error rate (BER) of $10^{-3}$. Further, power saving is achieved at the same time due to the amount of null operations of the correlators (i.e., correlating with "0" represents a null operation for most correlators).

In addition to the above, another aspect of the disclosure relates to an algorithm for estimating the noise power level of the output(s) of the correlator(s) of the baseband processing unit. In an embodiment, the noise estimation unit 24 of the baseband processing unit 16 is configured to perform or execute the algorithm. The estimated noise level may be used in many ways or for a number of purposes such as in the setting or adjustment of one or more operating parameters of the baseband processing unit. For example, the estimated noise level may be used in the adaptive setting of the threshold di used to determine whether to wake the main receiver, and/or in the widening of the dynamic range of the WuRX.

As it relates to the adaptive setting of the threshold th, the noise power perceived by the baseband processing unit may vary over time due to factors such as temperature fluctuation and change in interference power. Under this circumstance, the capability to estimate the noise power and set the threshold based thereon helps to maintain a stable false alarm rate of the WuRX.

Figure 5:
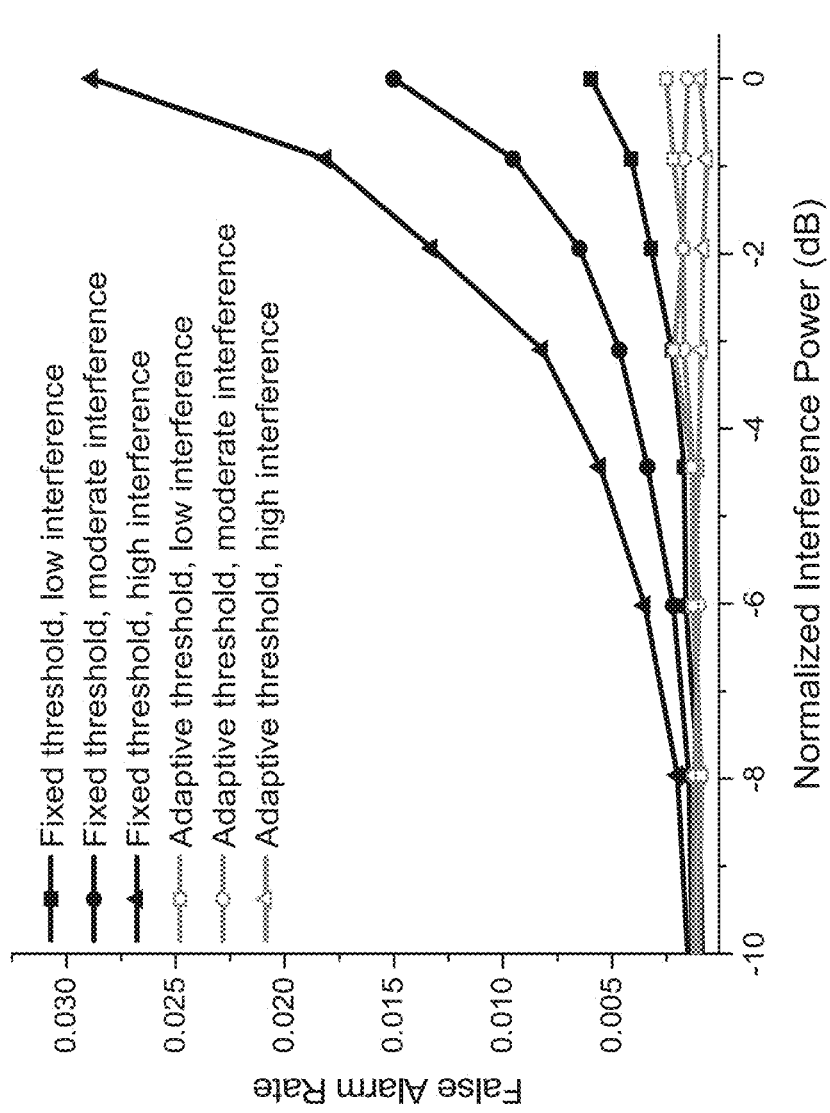
FIG. 5 is a graph illustrating false alarm rates of conventional baseband processing circuits and the baseband processing circuit of the present disclosure.

FIG. 5 illustrates false alarm rates of a conventional baseband processing unit and a baseband processing unit such as unit 16 that is configured to implement the noise estimating algorithm described herein. The interference signal is modeled as a train of rectangular signals having random lengths, random start times and fixed amplitude. The level of interference is represented by the density of the packets. Each rectangular signal can represent either a signal packet or one bit in on-off keying (OOK) modulation. As shown in FIG. 5, the false alarm rate of a conventional unit that uses a fixed value for the threshold th increases significantly as the interference power increases. On the other hand, a processing unit employing the noise estimating algorithm described herein maintains a good false alarm rate even when the interference power gets relatively large.

One way to estimate the noise power is to calculate the variance based on the definition. This way of estimating is straightforward and accurate, yet consumes a relatively high amount of power in view of the low-power power requirements of the WuRX. Another way to estimate noise is to utilize the range rule, i.e., use the minimum or maximum of a set of data to estimate the variance. The theoretical basis for the range rule is shown in equation (10):

$$\Phi(x_0) = \frac{1}{L} = P\left(x < \frac{x_{(1)} + x_{(2)}}{2}\right) \quad (10)$$

where L is the number of samples outputs, s, of the correlators) available, $\Phi(\cdot)$ is the cumulative density function (CDF) of a normally distributed random variable that may be obtained from, for example, a look-up table or computer program stored in a memory device of or accessible by the WuRX and the baseband processing unit, in particular, and $\{x_{(i)}\}$ are the samples sorted in a descending order. The estimated standard deviation then can be estimated using equation (11):

$$\tilde{\sigma} = \frac{x_{(1)} + x_{(2)}}{2\Phi^{-1}(1/L)} \quad (11)$$

Noise estimation based on equation (11) requires both the smallest and the second smallest correlator output values or samples evaluated, which may introduce some hardware complexity.

By way of illustration, assume that there are two correlators (correlator A and correlator B) having the following outputs s over a period of time: correlator A—0, 7, 2, and 10; correlator B—1, 4, 8 and 3. As such, at a given time, the combined correlator outputs would be 0, 1, 7, 4, 2, 8, 10 and 3. If L=4, at a first time t1, the four samples used would be 0, 1, 7 and 4. Accordingly, the smallest correlator output ($x_{(1)}$) would be 0 and the second smallest correlator output ($x_{(2)}$) would be 1. At a second time t2, the four (4) sample window would shift by the number of correlators in the processing unit, and the four samples used would be 7, 4, 2 and 8. Accordingly, the smallest correlator output ($x_{(1)}$) would be 2 and the second smallest correlator output ($x_{(2)}$) would be 4. And so on and so forth for different points in time. In any event, once the values of the smallest and second smallest correlator outputs are known, the noise may be estimated using equation (11) above.

Another way to estimate the noise only requires the minimum sample of the samples being evaluated. Suppose the minimum number (output value, s, of the correlators) is selected from L samples. The probability density function (PDF) of that minimum number can be represented by equation (12):

$$f_Y(y) = \frac{L}{\sigma}\Phi^{L-1}\left(\frac{y}{\sigma}\right)\phi\left(\frac{y}{\sigma}\right) \quad (12)$$

Therefore, the standard deviation can be estimated by equation (13):

$$\tilde{\sigma} = \frac{x_{(1)}}{L\int_{-\infty}^{+\infty}\Phi^{L-1}(y)\phi(y)} \quad (13)$$

The noise estimation algorithm described above estimates the power of the noise in a statistical manner. That is, the estimated standard deviation itself is a random variable. Therefore, noise is introduced in the system wherever the estimated quantity is used. To illustrate this, consider that the noise power is estimated from the output of a correlator. The estimated noise can be determined using equation (14):

$$\tilde{\sigma} = \tilde{\sigma}_0 + n_{\tilde{\sigma}_0} \quad (14)$$

where $\tilde{\sigma}_0$ is the actual noise power, and $n_{\tilde{\sigma}_0}$ is the noise associated with the estimation.

Once the noise power is estimated it can be used to adaptively set the threshold th with which the outputs s of the correlator(s) for detecting wake-up signals in the data received by the WuRX are compared. To achieve a desired false alarm rate, $P_{false}$, the threshold can be set using equation (15).

$$th = Q^{-1}(P_{false})\tilde{\sigma} \quad (15)$$

Thus, the decision expression for evaluating the output of a correlator with the threshold can be represented as shown in equation (16).

$$s + n - Q^{-1}(P_{false})n_{\tilde{\sigma}_0} > Q^{-1}(P_{false})\tilde{\sigma}_0 \quad (16)$$

As can be seen from equation (16), noise generated in estimating the noise power can be combined with the original noise. Therefore, it is advantageous to control the newly added noise to be negligible compared to the original noise.

Figure 6:
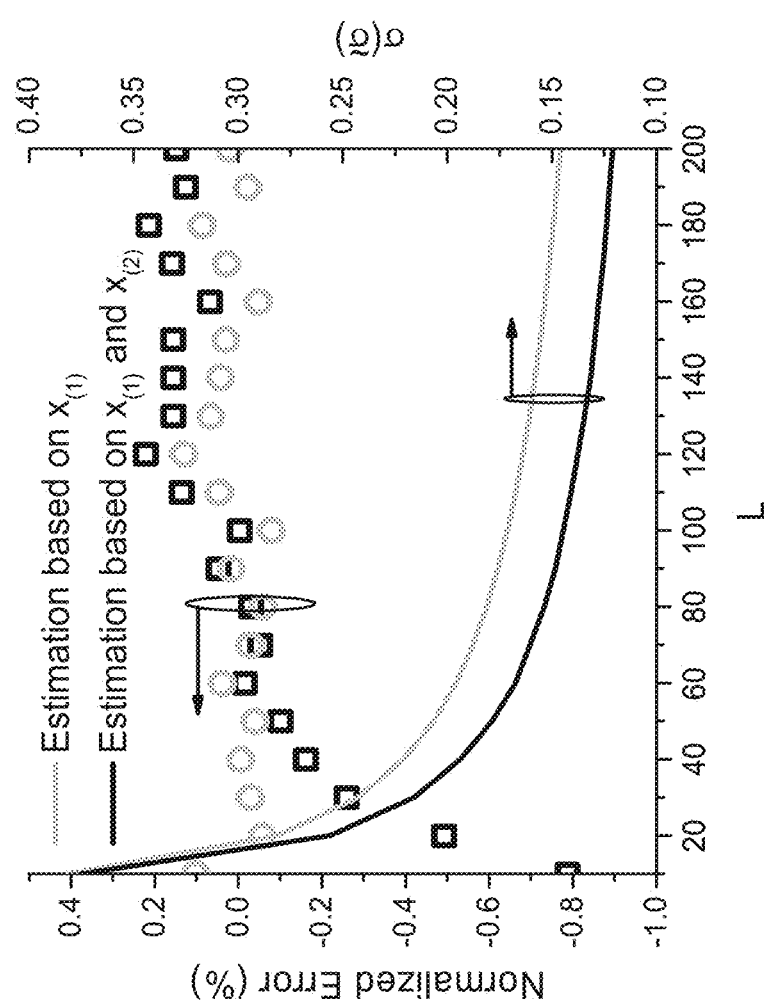
FIG. 6 is a graph illustrating normalized estimation error and standard deviation of the noised estimated by the baseband processing circuit of the present disclosure versus the size of the samples used.

FIG. 6 shows the normalized estimation error and the standard deviation of the estimated standard deviation $\sigma(\tilde{\sigma})$. As can be seen, both estimation methods can yield an estimation with an error less than 1% for a wide range of L. Besides, the normalized standard deviation of the estimated standard deviation ($\tilde{\sigma}$), as expected, drops as the number of samples increases. Therefore, to reduce the noise in estimating the noise power, a large L is preferred. Another observation from FIG. 6 is that estimation based on both $x_{(1)}$ and $x_{(2)}$ is less noisy than the estimation based only on $x_{(1)}$. Intuitively, this is because the more information from the samples is used, the more accurate the estimation becomes. Therefore, one can increase the hardware complexity to reduce the $\sigma(\tilde{\sigma})$. Alternatively, filtering can be done on $\sigma(\tilde{\sigma})$ to keep reducing its value.

As it relates to the hardware implementation shown in FIG. 2 that is configured to carry out or perform the functionality described above, the clock signal generated by the VCO is asynchronous to the control signals such as a LATCH signal (used to control the following circuit to read the number or output from the correlators) and an UP/DOWN signal (used to control the up/down counter to count up or down). This may be problematic when the control signals change at or near the active edge of the clock. The uncertainty of the control signal appears as noise, and the more catastrophic effect arises when the flip flops in the counter see different control signals at the clock edge due to noise or interconnect delay. Therefore, appropriate synchronization has to be achieved for the circuit to function correctly.

Figure 7:
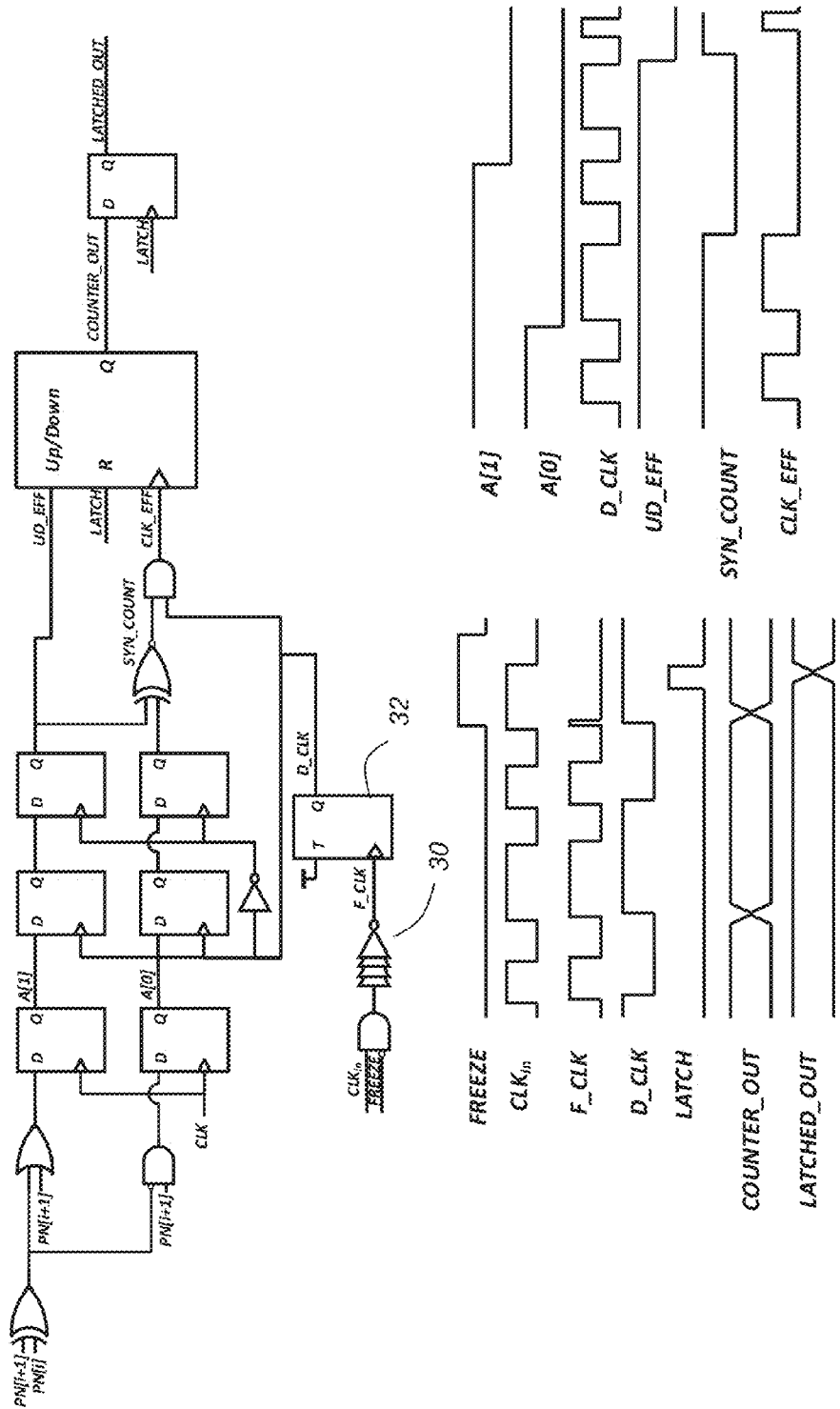
FIG. 7 is a schematic and diagrammatic illustration of an embodiment of a circuit that includes or serves as an interface of sorts between various components of the baseband processing circuit illustrated in FIG. 2.

FIG. 7 illustrates an embodiment of a circuit that includes or serves as an interface of sorts between various components shown in FIG. 2, including the VCO 20 or divider 21, the correlators 22 (e.g., up/down counters) and the pseudo-random code generator 28. As shown in FIG. 7, a FREEZE signal is introduced to freeze the correlator/counter whenever a latch or reset operation is needed. Therefore, the situations where the counter alters its value when the output registers are latching the data or right after the reset is released are avoided. Since the FREEZE and the $CLK_{in}$ are asynchronous, very narrow pulses might be generated when the FREEZE takes change near the edge of $CLK_{in}$. A series or collection of inverters 30 are used to swallow very narrow pulses, and a T flip-flop 32 is employed to resolve the pulse. No matter what the T flip-flop 32 interprets the narrow pulse as, flip-flops in the following counters see the same reliable clock.

The pseudo-random codes designated as "PN" control signals in FIG. 7 are synchronized with the input by synchronizers that are commonly used in asynchronous links. A subtle difference is that in an asynchronous link, only one control signal (normally request or acknowledge signal) is synchronized by the synchronizer. Synchronization of a multi-bit signal is typically avoided since incorrect signals might be latched if more than one bit takes change near the clock edge. Therefore, a special encoding technique is needed to ensure the correctness of the proposed logic since two-bit signals are needed to be synchronized. As shown in FIG. 7 '1', '0' and '−1' are encoded as '11', '10' and '00' respectively. Since in the method described herein there is neither a transition from '1' to '−1' nor a transition from '−1' to '1', the situation that both two-bit signals transmit at the same time can be avoided. Besides, as shown in FIG. 7, in the case where '0' is correlated, the clock to the correlator (i.e., up/down counter) is gated, and thus power is saved.

In an embodiment, each correlator 22 in the baseband processing unit 16 will have a circuit like that illustrated in FIG. 7 associated therewith for synchronization purposes.

As described elsewhere above, another important aspect of a WuRX is the maintenance of a good dynamic range. The dynamic range is the ratio between maximum signal power that can be tolerated by the WuRX and the minimum signal power that the WuRX can detect. If the range is too small, the wake-up signal cannot be detected due to noise; while if it is too high, the WuRX will be saturated. One way in which to maintain the range at an acceptable level is by maintaining the noise level of the output of the correlator(s) at a preset or constant level. To do so, the gain in the divider 21 may be dynamically or adaptively adjusted.

In the embodiment illustrated in FIG. 2, the VCO 20 behaves as a matched filter in a chip level. At the output of the correlator(s) 22, signal and noise parts are as set forth in equations (17) and (18):

$$S = \frac{K_{VCO}V_{in}T_s}{2\pi} \quad (17)$$

$$\sigma_B = \frac{K_{VCO}}{2\pi}\sqrt{\frac{N_0 N T_s}{2}} \quad (18)$$

where Vin is the input signal to the correlator(s) 22, $T_s$ is the chip interval, and $N_0$ is the noise power spectrum density at the input, and the noise is assumed to be white noise. $K_{VCO}$ is the effective gain of the VCO 20 plus the divider 21, which is equal to $K_{VCO}/2G$, where $K_{VCO}$ and ½G are the gain of the VCO 20 and the divider 21, respectively.

In the processing unit 16 shown in FIG. 2, quantization is introduced by the VCO 20. For a balanced pseudo-random code (e.g., a balanced M-sequence) with a period of N, the quantization noise presented at the output of the correlator(s) 22 is shown in equation (19).

$$n_q \sim U\left(-\frac{\sqrt{\frac{N}{2}+1}}{2}, \frac{\sqrt{\frac{N}{2}+1}}{2}\right) \quad (19)$$

According to equations (18) and (19), $K_{VCO}$ should be chosen to be large enough such that $n_q$ is much smaller than $n_B$, which is the noise at the input of the correlators and is a random variable described by parameter $\sigma_B$. More specifically, $n_B$ is a normally distributed random variable and $\sigma_B$ is the standard deviation of that distribution. Meanwhile, $K_{VCO}$ should be as small as possible to reduce the power consumption. If the power of quantization noise is set to be p times the input noise, KVCO may be represented by equation (20).

$$K_{VCO} = \frac{2\pi}{p}\sqrt{\frac{\frac{N}{2}+1}{6N_0 N T_s}} \quad (20)$$

Figure 8:
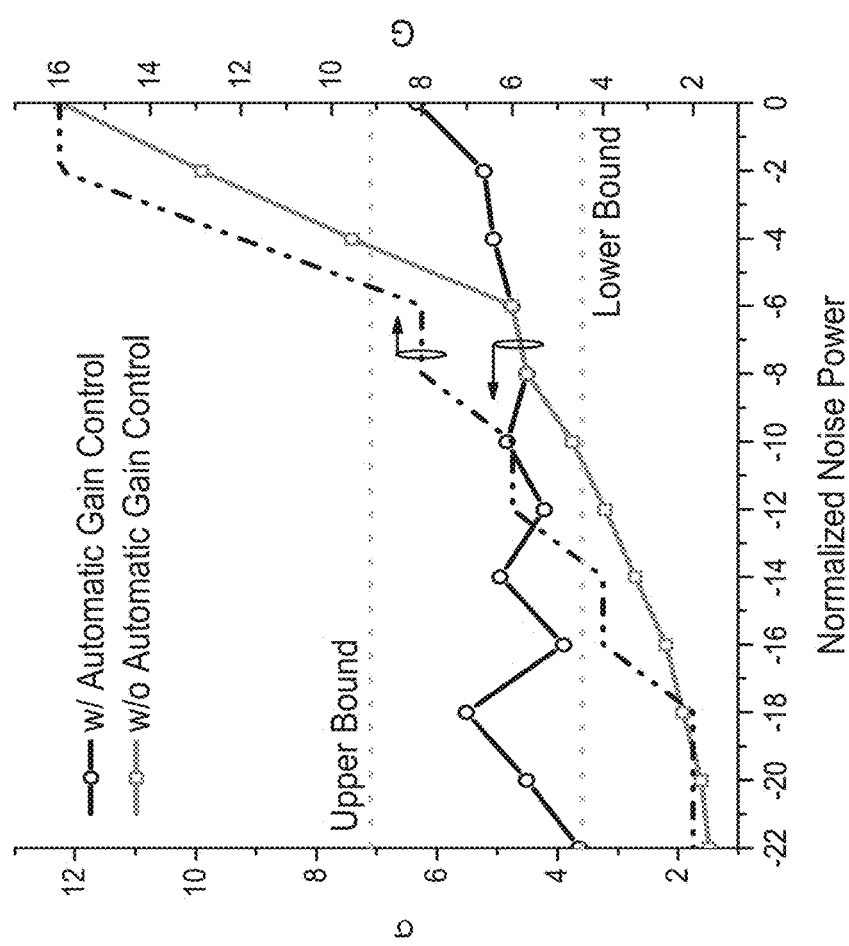
FIG. 8 is a graph illustrating noise power of the output of the correlators of the baseband processing circuit illustrated in FIG. 2 versus input noise power for cases where automatic gain control is employed, and cases where automatic gain control is not employed.

When the input signal power is small, or $K_{VCO}$ is small because of PVT variation, the quantization noise starts dominating, deteriorating the SNR. When the input signal power is too large, the number of bits of the counters should be large to prevent overflow, increasing the power consumption and area. To increase the dynamic range without significantly increasing the power consumption, the noise estimate determined using the noise estimation algorithm described above may be used in a feedback loop to automatically adjust gain in front of the correlators 22, which is shown as the feedback path in FIG. 2. In FIG. 2, the gain of the divider 21 is adjusted. One reason for this is that it not only provides monotonicity, but also yields a more digital design. Gain control may also or alternatively be applied on the VCO 20 through a capacitor DAC or on the baseband amplifier to possibly save the power of the VCO 20 and the divider 21. FIG. 8 shows how the proposed feedback loop adaptively adjusts the gain to maintain the noise level of the output of the correlator 22 to stay in a predefined range regardless of the change in the input noise power. The simulation used to show this is conducted as follows: the VCO is simulated by Spectre with noise presented at its input. The generated clock signal is then fed into a Verilog simulator to test the circuit response.

Empirical testing was conducted using computer simulations to evaluate the performance of the baseband processing unit 16 described above. Power consumption of the various components of the unit 16 are set forth in Table I below for a chip rate of 10 Kbps and a supply voltage of 0.35 V.

TABLE I

| Block/Component | Power Consumption (mW) |
|---|---|
| VCO | 4 |
| Divider | 2.2 |
| Up/Down Counters (Correlators) | 7.4 |
| Noise Estimation Unit | 0.7 |
| Decision Logic | 0.5 |
| Pseudo-Random Code Generator | 0.2 |
| Total | 16 |

As can be seen from Table I, power consumption of the up/down counter(s) (correlators) 22 dominates the power consumption of the processing unit 16, and the proposed noise estimation unit 24 does not pose much power overhead (less than 5%). The VCO 20 and divider 21 consume a significant portion of the total power due to the fact that the VCO 20 is designed to run eight (8) times (nominal value of G is 8) faster than the required frequency in order for the divided clock frequency to meet the requirement posed by controlling quantization noise. Therefore, power consumption of the VCO 20 and divider 21 can be reduced if the feedback is applied to the capacitor DAC of the ring oscillator or the analog PGA in front of the VCO 20 as mentioned elsewhere above.

A comparison of the baseband processing unit 16 described above with existing or conventional (conv.) designs is shown in Table II.

TABLE II

| | Unit of FIG. 2 | Conv. Unit 1 | Conv. Unit 2 |
|---|---|---|---|
| Bits in Pseudo-Random Code | 16 | 64 | 31 |
| Oversampling Rate | 1 | 2 | 2 |
| Chip Rate (Kbps) | 10 | 100 | 12.5 |
| Power Consumption (nW) | 16 | 400 | 69.5 |
| Technology (nm) | 65 | 130 | 130 |
| Adaptive Threshold | Yes | No | Yes |
| Soft-Decision Decoding | Yes | Yes | No |
| Dynamic Range Widening | Yes | No | Yes |
| Continuous/Discrete Time | Continuous | Discrete | Discrete |
| Implementation Type | Mixed-signal | Analog | Digital |
| Supply Voltage | 0.35 | 1.0 | 0.5 |

As can be seen from Table II, the processing unit 16 of the present disclosure achieves adaptive threshold setting, dynamic range widening, soft-decision decoding and continuous-time operation simultaneously, thereby improving the processing performance. Also, the sum-based correlation described above (i.e., summing or adding two pseudo-random codes and using the result for correlating a received signal) improves the SNR without need of oversampling, further reducing the power consumption.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiments) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of operating a baseband processing unit of a wake-up receiver, comprising:
   receiving a signal containing a pseudo-random code from a transmitting device;
   adding a local pseudo-random code associated with a first correlator of the processing unit with a local pseudo-random code associated with a second correlator of the processing unit to generate a summed local pseudo-random code;
   correlating by the first correlator the received pseudo-random code with the summed local pseudo-random code;
   comparing an output of the first correlator with a predetermined threshold; and
   determining whether or not to generate a wake-up signal based on the comparison.

2. The method of claim 1, wherein the adding step comprises adding a local pseudo-random code associated with a third correlator of the processing unit with the local pseudo-random codes associated with the first and second correlators to generate the summed local pseudo-random code.

3. The method of claim 1, wherein the summed local pseudo-random code comprises a first summed local pseudo-random code, the method further comprising:
   adding the local pseudo-random code associated with the second correlator with a local pseudo-random code associated with a third correlator of the processing unit to generate a second summed local pseudo-random code;
   correlating by the second correlator the received pseudo-random code with the second summed local pseudo-random code;
   comparing the output of the second correlator with the predetermined threshold; and
   determining whether or not to generate a wake-up signal based on at least one of the comparisons of outputs of the first and second correlators with the threshold.

4. The method of claim 3, further comprising:
   adding the local pseudo-random code associated with the first correlator with the local pseudo-random code associated with the third correlator to generate a third summed local pseudo-random code;
   correlating by the third correlator the received pseudo-random code with the third summed local pseudo-random code;
   comparing the output of the third correlator with the predetermined threshold; and determining whether or not to generate a wake-up signal based on at least one of the comparisons of outputs of the first, second, and third correlators with the threshold.

5. The method of claim 1, further comprising:
receiving by a noise estimation unit of the processing unit the output of the first correlator;
estimating a noise level of the output of the first correlator based on the received correlator output; and
adjusting one or more operating parameters of the processing unit based on the estimated noise level.

6. The method of claim 5, wherein the adjusting step comprises adjusting the threshold used by the processing unit to determine whether or not to generate a wake-up signal.

7. The method of claim 5, wherein the adjusting step comprises adjusting the gain of a component of the processing unit to adjust the dynamic range of the wake-up receiver.

8. A baseband processing unit for a wake-up receiver, comprising:
a first correlator; and
a second correlator, wherein the baseband processing unit is configured to:
  receive a signal containing a pseudo-random code from a transmitting device;
  add a local pseudo-random code associated with the first correlator with a local pseudo-random code associated with the second correlator to generate a summed local pseudo-random code;
  correlate, by the first correlator, the received pseudo-random code with the summed local pseudo-random code;
  compare an output of the first correlator with a predetermined threshold; and
  determine whether or not to generate a wake-up signal based on the comparison.

9. A method of operating a baseband processing unit of a wake-up receiver, comprising:
receiving a signal containing a pseudo-random code from a transmitting device;
correlating by a first correlator of the processing unit the received pseudo-random code with a local pseudo-random code associated with the first correlator;
correlating by a second correlator of the processing unit the received pseudo-random code with a local pseudo-random code associated with the second correlator;
adding an output of the first correlator with an output of the second correlator to determine a combined output of the first and second correlators;
comparing the combined output of the first and second correlators with a predetermined threshold; and
determining whether or not to generate a wake-up signal based on the comparison.

10. The method of claim 9, further comprising:
correlating by a third correlator of the processing unit the received pseudo-random code with a local pseudo-random code associated with the third correlator;
adding the output of the third correlator with the output of the second correlator to determine a combined output of the second and third correlators;
comparing the combined output of the second and third correlators with a predetermined threshold; and
determining whether or not to generate the wake-up signal based on the comparisons of the combined output of the first and second correlators and the combined output of the second and third correlators with the threshold.

11. The method of claim 10, further comprising:
adding the output of the first correlator with the output of the third correlator to determine a combined output of the first and third correlators;
comparing the combined output of the first and third correlators with a predetermined threshold; and
determining whether or not to generate the wake-up signal based on the comparisons of at least one of the combined output of the first and second correlators, the combined output of the second and third correlators, and the combined output of the first and third correlators with the threshold.

12. The method of claim 9, further comprising:
receiving by a noise estimation unit of the processing unit, the outputs of the first and second correlators;
estimating a noise level of the outputs of the first and second correlators based on the received correlator outputs; and
adjusting one or more operating parameters of the processing unit based on the estimated noise level.

13. The method of claim 12, wherein the adjusting step comprises adjusting the threshold used by the processing unit to determine whether or not to generate a wake-up signal.

14. The method of claim 12, wherein the adjusting step comprises adjusting the gain of a component of the processing unit to adjust the dynamic range of the wake-up receiver.

15. A baseband processing unit for a wake-up receiver, comprising:
a first correlator; and
a second correlator, wherein the baseband processing unit is configured to:
  receive a signal containing a pseudo-random code from a transmitting device;
  correlate, by the first correlator, the received pseudo-random code with a local pseudo-random code associated with the first correlator;
  correlate, by the second correlator, the received pseudo-random code with a local pseudo-random code associated with the second correlator;
  add an output of the first correlator with an output of the second correlator to determine a combined output of the first and second correlators;
  compare the combined output of the first and second correlators with a predetermined threshold; and
  determine whether or not to generate a wake-up signal based on the comparison.

16. A method of operating a baseband processing unit of a wake-up receiver, comprising:
receiving by a noise estimation unit of the processing unit, outputs of one or more correlators of the processing unit;
estimating a noise level of the output of the one or more correlators based on the received correlator outputs; and
adjusting one or more operating parameters of the processing unit based on the estimated noise level, wherein the one or more parameters includes a gain of a component which is adjusted in order to adjust a dynamic range of the wake-up receiver.

17. The method of claim 16, wherein the adjusting step comprises adjusting the threshold used by the processing unit to determine whether or not to generate a wake-up signal.

18. A baseband processing unit for a wake-up receiver, comprising:
  a noise estimation unit; and
  one or more correlators, wherein the baseband processing unit is configured to:
    receive, by the noise estimation unit, outputs of one or more correlators;
    estimate a noise level of the output of the one or more correlators based on the received correlator outputs; and
    adjust one or more operating parameters of the processing unit based on the estimated noise level, wherein the one or more parameters includes a gain of a component which is adjusted in order to adjust a dynamic range of the wake-up receiver.

* * * * *